United States Patent [19]

Govang

[11] E Re. 29,002

[45] Reissued Oct. 12, 1976

[54] MERCHANDISING DISPLAY ASSEMBLY

[75] Inventor: James A. Govang, Clinton, Conn.

[73] Assignee: The Stanley Works, New Britain, Conn.

[22] Filed: Mar. 14, 1975

[21] Appl. No.: 558,308

Related U.S. Patent Documents

Reissue of:

[64] Patent No.: 3,799,357
Issued: Mar. 26, 1974
Appl. No.: 261,800
Filed: June 12, 1972

[52] U.S. Cl. ..... 211/59; 248/DIG. 3
[51] Int. Cl.[2] ..... A47F 7/00
[58] Field of Search ..... 211/59, 57, 54, 60 T; 248/DIG. 3, 223; 40/143

[56] References Cited

UNITED STATES PATENTS

| | | | |
|---|---|---|---|
| 1,188,452 | 6/1916 | Johnson | 248/DIG. 3 |
| 1,429,458 | 9/1922 | Samuels | 40/143 |
| 2,847,773 | 8/1958 | Herrick | 40/143 UX |
| 3,058,706 | 10/1962 | Snell | 248/DIG. 3 |
| 3,089,269 | 5/1963 | McKiernan | 40/143 |
| 3,200,960 | 8/1965 | Banse | 211/59 |
| 3,696,937 | 10/1972 | Braverman | 211/54 |

FOREIGN PATENTS OR APPLICATIONS

| | | |
|---|---|---|
| 585,305 | 2/1947 | United Kingdom |

*Primary Examiner*—Ramon S. Britts

[57] ABSTRACT

A merchandising display assembly comprises a pegboard and a display card disengageably secured upon one surface thereof. The display card has a plurality of apertures which register with holes of the pegboard, and merchandise hangers have engagement portions which pass through the apertures and seat in the holes aligned therewith. Most desirably, the display card is printed with an advertising message and/or bears indicia for arrangement of the merchandise on specific hangers associated therewith.

5 Claims, 3 Drawing Figures

MERCHANDISING DISPLAY ASSEMBLY

Matter enclosed in heavy brackets [ ] appears in the original patent but forms no part of this reissue specification; matter printed in italics indicates the additions made by reissue.

*CROSS REFERENCE TO RELATED APPLICATION*

*This is a reissue of U.S. Pat. No. 3,799,357 granted Mar. 26, 1974.*

BACKGROUND OF THE INVENTION

Perforated mounting boards, one brand of which is sold under the trademark PEGBOARD by F.M. Thorpe Manufacturing Company of Lamar, Missouri, are widely employed for merchandising purposes in point of purchase displays due to the convenience and flexibility of display arrangement and the desirable levels of support which they afford. Such boards are used in combination with various types of brackets or hangers having means enabling facile engagement in any of the numerous holes thereof, and in most instances the mounting boards are secured to walls or other vertical support structures. Notwithstanding the obvious and well-recognized advantages of such perforated board systems, in most cases they do not conveniently provide means for changing advertising, thus necessitating reliance upon a header or mounting card associated with each article for that purpose. Moreover, the existing systems generally provide no preestablished organizational format, which often results in the rather haphazard and unattractive arrangement of the merchandise.

Assortments of items are commonly supplied to the merchant affixed to stand-up display cards and the like, which do afford some benefits in terms of advertising space and prearrangement. However, because no provision is made for replacement of purchased merchandise, the supply of items in greatest demand will frequently be the first to become exhausted from such a card, leaving only the less popular items on display. Moreover, the weight and number of articles which such cards are capable of supporting are very limited.

Accordingly, it is an object of the present invention to provide a novel merchandising display assembly utilizing a perforated board-type support wherein a display panel may be used with a replenishable supply of articles.

It is also an object of the invention to provide such an assembly enabling the display of an assortment of articles of merchandise in a highly attractive, convenient, simple and inexpensive manner.

A more specific object is to provide a novel assembly for the display of merchandise which affords the convenience and supportive advantages of perforated board systems, while at the same time providing highly effective advertising and/or organizational features.

SUMMARY OF THE INVENTION

It has now been found that the foregoing and related objects of the present invention are readily attained in a merchandising display assembly comprising, in combination, a mounting board, at least one relatively thin display panel, securing means disengageably securing the display panel to the mounting board, and a plurality of merchandise support members. The mounting board has a multiplicity of mounting recesses distributed over one surface thereon in a predetermined pattern, and the display panel has a plurality of apertures therethrough which are aligned with a cooperating plurality of the recesses of the mounting board. The securing means mounts the display panel upon one surface of the mounting board with the apertures and mounting recesses thereof in alignment. Engagement portions of the support members extend through the apertures of the display panel and are disengageably seated in the aligned recesses of the mounting board, so as to mount them thereon. The support members have support portions which extend outwardly from the "one" surface of the mounting board and of the outer surface of the display panel, thereby enabling the support of articles of merchandise thereadjacent with the display panel interposed therebetween.

Normally, the mounting recesses of the mounting board will be distributed in a pattern of parallel rows and columns with substantially uniform spacing between recesses of the rows and of the columns, and the outer surface of the display panel desirably has indicia provided thereon. The display panel is conveniently secured to the mounting board by the use of at least two fasteners which extend through spaced apertures of the display panel and are disengageably seated in recesses of the mounting board in registry therewith.

[In preferred embodiments, at least one of the] *The* support [members] *member* is a hanger of rigid, wire-like construction; such a hanger will have a thin elongated hook element providing the support portion and, to provide the engagement portion, an element which passes inwardly through the aligned apertures and radially therefrom behind the opposite surface of the mounting board.

The outer surface of the display panel may have a plurality of discrete areas of indicia thereon, and the assembly may additionally include a variety of articles of merchandise. In such a case, articles of one variety will be supported by one of the support members adjacent each of the areas of indicia, with the areas of indicia being specifically indicative of the adjacently supported articles. Most desirably, the assembly includes at least a second display panel secured upon the "one" surface of the mounting board in the same manner as the first-mentioned panel. Such an assembly may additionally include at least two different types of articles, with articles of one type being supported adjacent each of the display panels. In such an assembly, the display panels will bear indicia on their outer surfaces which are specifically indicative of the articles supported adjacent thereto.

DETAILED DESCRIPTION OF THE ILLUSTRATED EMBODIMENT

Figure 1:
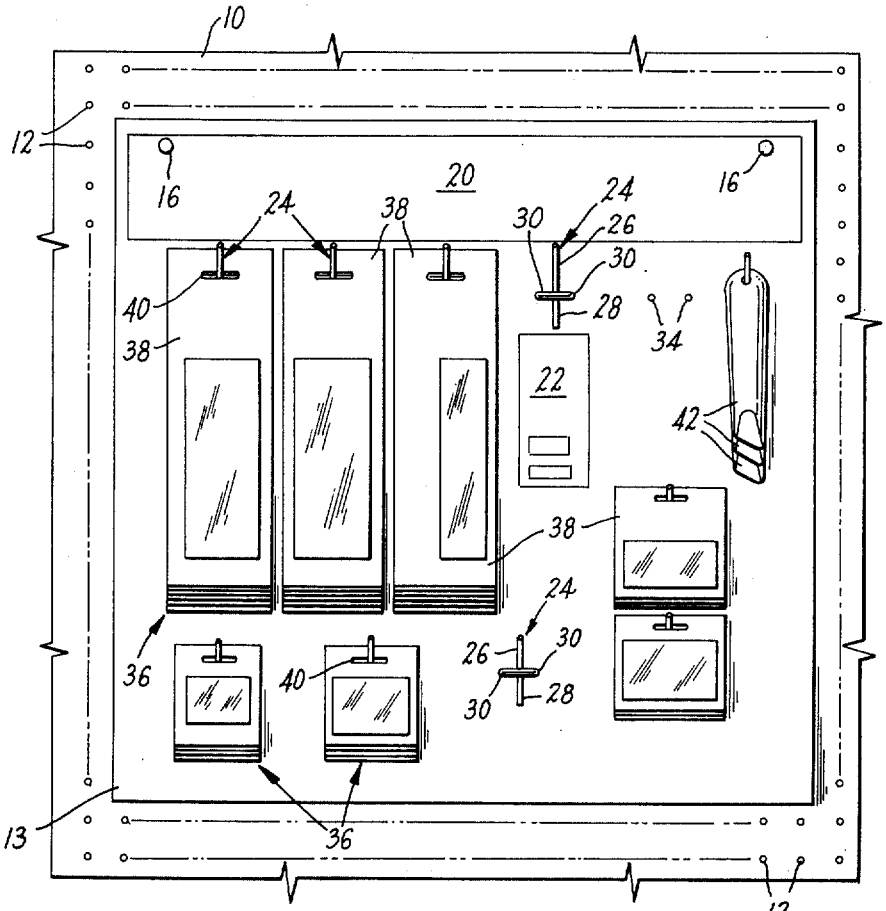
FIG. 1 of the drawing is a fragmentary front elevational view of a merchandising display assembly embodying the present invention and having an assortment of articles mounted thereon.
Figure 2:
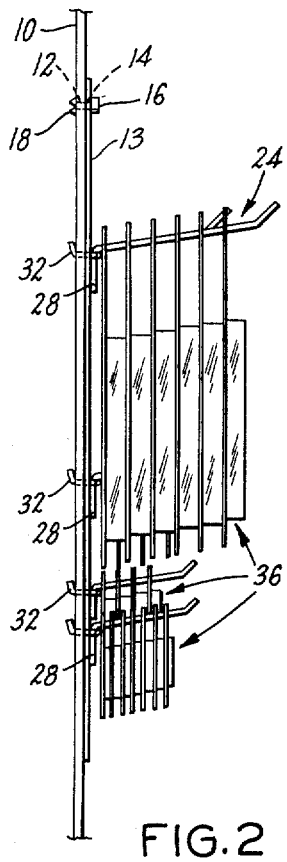
FIG. 2 is a side elevational view thereof.
Figure 3:
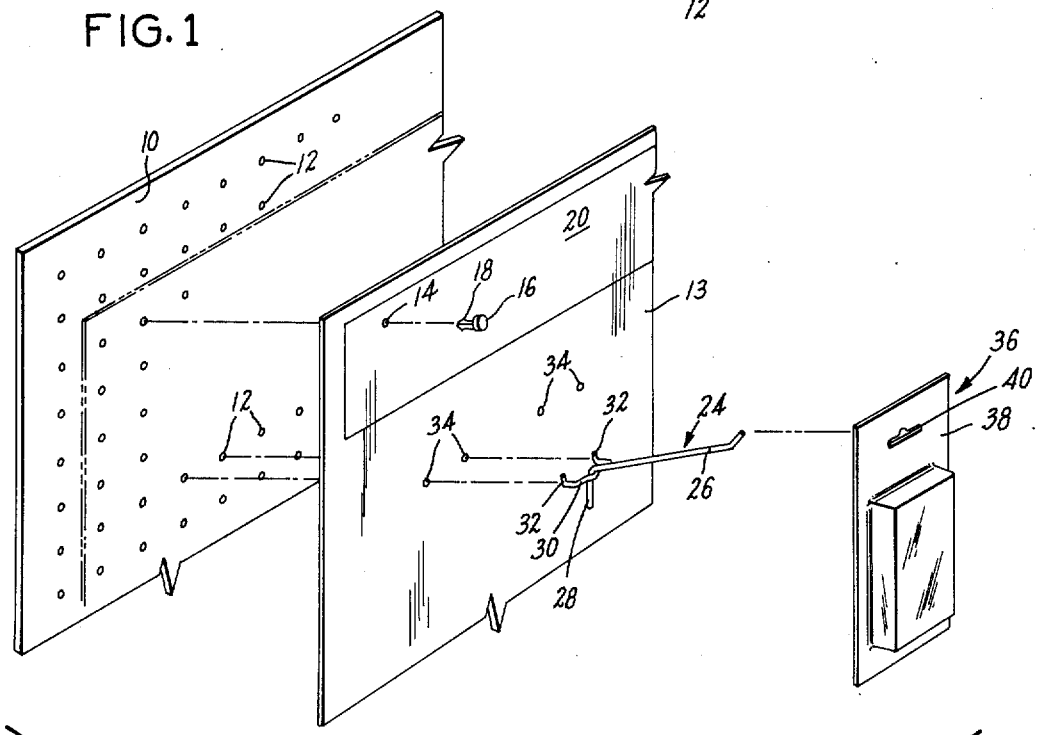
FIG. 3 is an exploded isometric view of a portion thereof.

Turning now in detail to the appended drawing, therein illustrated is a merchandising display assembly embodying the present invention and consisting of a mounting board or perforated board 10 having a multiplicity of small holes 12 distributed in a uniform rectangular pattern thereover. A rectangular display panel or card 13 is provided with an aperture 14 (only one of which is seen) adjacent each of its upper corners, through which is inserted a pin 16 having an expandable snap portion 18, which is seated in one of the holes 12 of the perforated board 10 to disengageably secure the card 13 thereagainst. The card 13 has an area 20 for printing (e.g., of advertising matter), and discrete areas, such as 22, provide legends or pictorial representations of the particular items to be located thereover or thereadjacent.

The assembly also includes a multiplicity of support members or hangers, generally designated by the numeral 24, of conventional design and generally fabricated from a relatively heavy gauge wire to afford adequate strength. Each hanger consists of a first piece integrally providing an outwardly extending hook element 26 and a downwardly extending leg 28, and a second piece affixed thereto and providing outwardly extending arm portions 30 with upturned engagement portions 32 at each end thereof. As will be appreciated, the apertures 34 (which are the same size as apertures 14 and are separately designated only for purposes of illustration) are so spaced on the card 13 (in parallel rows and columns with uniform spacing therebetween) that they register with holes 12 in the perforated board 10, to permit insertion of the upturned portions 32 therethrough with the hangers 24 tilted upwardly from their normal supported positions. Pivoting the hangers 24 about an axis through the arm portions 30 causes the upturned portions 32 to engage the rear face of the pegboard 12 and depending leg 28 to bear upon the front face. The leg 28 and upturned portions 32 cooperatively resist downward force and thereby enable a considerable weight of merchandise to be supported on the hook portion 26.

To illustrate the manner of use, an assortment of so-called "blister" packages, generally designated by the numeral 36, and several tools 42 are supported by the assembly. The card 38 of each package 36 has an elongated aperture 40 in which the hook portion 26 of one of the several hangers 24 is inserted, and the tools 42 are hung in a similar manner. As can be seen, a number of items are thereby supported in stacked relationship upon the hangers 24 for individual removal, and it will be appreciated that an area of indicia (such as 22) underlies each stack of packages 36 and the tools 42 to prescribe their locations.

Having thus described the invention, I claim:

1. In a merchandising display assembly, the combination comprising: a substantially rigid mounting board having a multiplicity of *substantially identically configured and dimensioned* mounting [recesses] *holes evenly* distributed over one surface thereof in a predetermined *regular* pattern, *said holes comprising substantially entirely the apertures in said mounting board*; at least one *sheet-like* display panel relatively thin with respect to said mounting board and having a plurality of apertures therethrough aligned with a cooperating plurality of said [recesses] *holes* of said mounting board, [said] *the* outer surface of said display panel having a plurality of discrete areas of product identifying indicia thereon; securing means disengageably securing said display panel upon one surface of said mounting board with said apertures and mounting [recesses] *holes* thereof aligned, *said securing means comprising at least two fasteners extending through spaced apertures in said display panel and disengageably seated in some of said holes of said mounting board in registry therewith*; and a plurality of [merchandise support members] *hangers of rigid, wire-like construction* having engagement portions extending through said apertures and disengageably seated in aligned [recesses] *holes* of said mounting [boards] *board, said engagement portions projecting radially from said aligned holes* and thereby mounting and supporting said [support members] *hangers* on said mounting board, said [support members] *hangers* having *elongated hook elements providing* support portions extending outwardly from said one surface of said mounting board and of the outer surface of said display panel for the support of articles of merchandise thereadjacent with said display panel interposed therebetween.

2. The assembly of claim 1 wherein the pattern of said mounting [recesses] *holes* provides parallel rows and columns with substantially uniform spacing between [recesses] *holes* of the rows and of the columns.

[3. The assembly of claim 1 wherein said securing means comprises at least two fasteners, said fasteners extending through spaced apertures of said display panel and being disengageably seated in recesses of said mounting board in registry therewith.]

[4. The assembly of claim 1 wherein at least one of said support members is a hanger of rigid, wire-like construction, said hanger having an elongated hook element providing said support portion and an element passing inwardly through one of said aligned apertures and radially therefrom behind the opposite surface of said mounting board to provide said engagement portion thereof.]

5. The assembly of claim 1 wherein said assembly additionally includes a variety of articles of merchandise, articles of one of said varieties being supported by one of said [support members] *hangers* adjacent each of said areas of indicia, and said areas of indicia being specifically indicative of the adjacently supported articles.

6. The assembly of claim 1 wherein said assembly includes at least a second of said display panels so secured upon said one surface of said mounting board.

7. The assembly of claim 6 wherein said assembly additionally includes at least two different types of articles of merchandise, articles of one of said types being supported adjacent each of said display panels, and said display panels bearing indicia on said outer surfaces thereof specifically indicative of said articles supported adjacent thereto.

* * * * *